(12) United States Patent
Noguchi et al.

(10) Patent No.: US 11,461,817 B2
(45) Date of Patent: Oct. 4, 2022

(54) ACCOMMODATION AREA MANAGEMENT DEVICE

(71) Applicant: HONDA MOTOR CO., LTD., Tokyo (JP)

(72) Inventors: Junpei Noguchi, Saitama (JP); Gaku Shimamoto, Saitama (JP); Yuta Takada, Tokyo (JP); Ryoma Taguchi, Tokyo (JP); Shogo Kobayashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1 day.

(21) Appl. No.: 17/207,113

(22) Filed: Mar. 19, 2021

(65) Prior Publication Data

US 2021/0295402 A1    Sep. 23, 2021

(30) Foreign Application Priority Data

Mar. 19, 2020  (JP) .............................. JP2020-050303

(51) Int. Cl.
*G06Q 30/04*   (2012.01)
*G08G 1/127*   (2006.01)
*G06Q 50/30*   (2012.01)

(52) U.S. Cl.
CPC ............. *G06Q 30/04* (2013.01); *G06Q 50/30* (2013.01); *G08G 1/127* (2013.01); *G06Q 2240/00* (2013.01)

(58) Field of Classification Search
CPC .... G06Q 2240/00; G06Q 30/04; G06Q 50/30; G08G 1/127
See application file for complete search history.

(56) References Cited

U.S. PATENT DOCUMENTS

| | | | |
|---|---|---|---|
| 2003/0146852 A1* | 8/2003 | O'Dell | G07B 15/02 340/932.2 |
| 2017/0329346 A1* | 11/2017 | Latotzki | G05D 1/0088 |
| 2019/0171209 A1* | 6/2019 | Lee | G08G 1/168 |
| 2019/0189010 A1* | 6/2019 | Yanagida | G01C 21/3667 |
| 2020/0211071 A1* | 7/2020 | Rosas-Maxemin | G06N 20/20 |

FOREIGN PATENT DOCUMENTS

JP           2012-155521 A       8/2012

* cited by examiner

*Primary Examiner* — Jeff Zimmerman
*Assistant Examiner* — Tayar M Kyu
(74) *Attorney, Agent, or Firm* — Paratus Law Group, PLLC

(57) ABSTRACT

An accommodation area management device, which manages an accommodation area for accommodating a moving body, includes an acquisition unit configured to acquire information including a desired environment regarding an accommodation position of the moving body when the moving body enters the accommodation area, an accommodation position determination unit configured to determine the accommodation position of the moving body based upon the information, and a use fee determination unit configured to determine a use fee of the accommodation area based upon at least one of the information and the accommodation position.

6 Claims, 4 Drawing Sheets

| PARKING SPACE ID | STATUS | VEHICLE ID | ENTRY TIME |
|---|---|---|---|
| 001 | EMPTY | — | — |
| 002 | FULL | KH003A | 2018/12/1 14:30 |
| 003 | EMPTY | — | — |
| ⋮ | ⋮ | ⋮ | ⋮ |

ACCOMMODATION AREA MANAGEMENT DEVICE

CROSS-REFERENCE TO RELATED APPLICATIONS

This application is based on and claims priority under 35 USC 119 from Japanese Patent Application No. 2020-050303 filed on Mar. 19, 2020.

TECHNICAL FIELD

The present disclosure relates to an accommodation area management device.

BACKGROUND ART

A parking space in a parking lot is not necessarily in the same installation environment. JP-A-2012-155521 describes a parking ticket processing terminal device in which a parking fee is discounted when a vehicle is parked in a parking area far from a shopping center in a large parking lot installed in the shopping center or the like.

However, in JP-A-2012-155521, while the discount is applied according to the distance from the shopping center, a user's desire is varied. Responding to such various desired environments regarding an accommodation position of the user leads to improvement in the convenience.

On the other hand, from a viewpoint of the parking lot management side, even when a vehicle of the user having various desired environments enters, it is desirable to perform smooth management and appropriately collect a use fee.

SUMMARY OF INVENTION

The present disclosure provides an accommodation area management device capable of collecting an appropriate use fee and smoothly managing an accommodation area.

According to the present disclosure, there is provided an accommodation area management device, which manages an accommodation area for accommodating a moving body, including an acquisition unit configured to acquire information including a desired environment regarding an accommodation position of the moving body when the moving body enters the accommodation area, an accommodation position determination unit configured to determine the accommodation position of the moving body based upon the information, and a use fee determination unit configured to determine a use fee of the accommodation area based upon at least one of the information and the accommodation position.

According to the present disclosure, an accommodation position can be determined according to a desired environment regarding the accommodation position of a moving body, and an appropriate use fee can be collected, and thus, an accommodation area can be managed smoothly.

DESCRIPTION OF EMBODIMENTS

Hereinafter, an embodiment of an accommodation area management device of the present disclosure will be described with reference to the accompanying drawings. The following embodiment will describe an example in which a moving body in the present disclosure is a vehicle and an accommodation area in the present disclosure is a parking lot. Further, the following embodiment will describe an example in which an accommodation area management device of the present disclosure is a parking lot management device for managing the parking lot.

[Vehicle System]

First, a vehicle of the embodiment (hereinafter, also referred to as a vehicle M) will be described. The vehicle M includes a vehicle system 1 illustrated in FIG. 1. The vehicle system 1 has a function capable of performing all driving tasks related to the vehicle M at least in a limited specific area (for example, in a parking lot PA which will be described later). Here, the driving task is, for example, a real-time driving function required for operating the vehicle M, such as controlling the movement of the vehicle M in the left-right direction (steering), controlling the movement in the front-rear direction (acceleration and deceleration), monitoring the driving environment, or the like, and a tactical function such as planning of a traveling track, or the like. The vehicle M is a vehicle including a drive source and wheels (for example, two wheels, three wheels, or four wheels) including a drive wheel driven by the power of the drive source. Further, the drive source of the vehicle M is, for example, an electric motor. The drive source of the vehicle M may be an internal combustion engine such as a gasoline engine, and a combination of the electric motor and the internal combustion engine.

Figure 1:
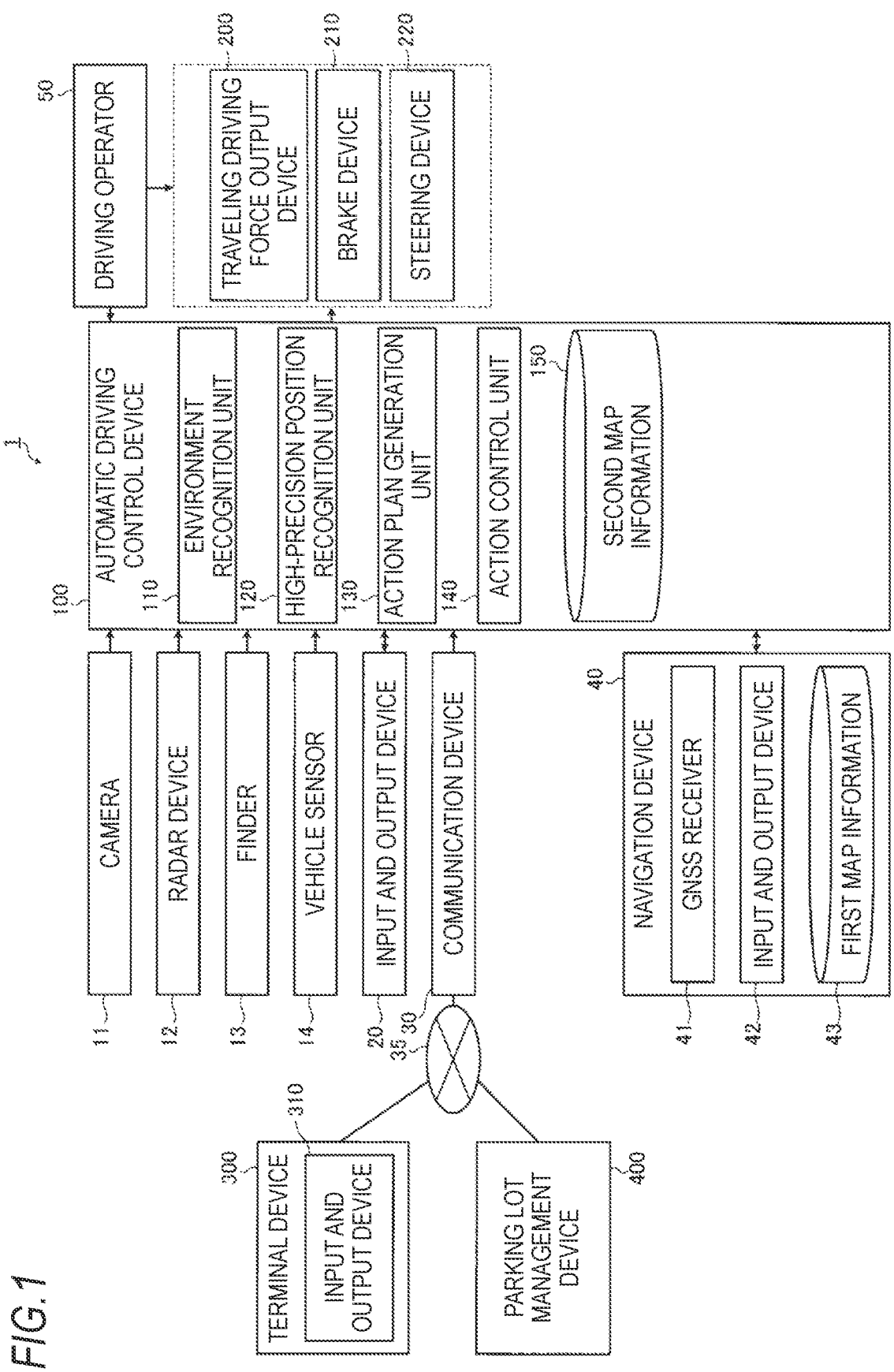
FIG. 1 is a diagram illustrating an example of a configuration of a vehicle system according to the embodiment.

As illustrated in FIG. 1, the vehicle system 1 includes a camera 11, a radar device 12, a finder 13, a vehicle sensor 14, an input and output device 20, a communication device 30, a navigation device 40, a driving operator 50, an automatic driving control device 100, a traveling driving force output device 200, a brake device 210, and a steering device 220. The respective devices are communicably connected to each other via a wired or wireless communication network. The communication network connecting the respective devices is, for example, a Controller Area Network (CAN).

The camera 11 is a digital camera which photographs the periphery of the vehicle M (for example, in front of the vehicle M), and outputs the image data obtained by photographing to the automatic driving control device 100. The radar device 12 is, for example, a radar device using radio waves in a millimeter wave band, detects a position of an object in the periphery of the vehicle M (for example, the front, the rear, and the side of the vehicle M), and outputs the detection result to the automatic driving control device 100.

The finder 13 is, for example, Laser Imaging Detection and Ranging (LIDAR), uses a predetermined laser beam to measure a distance to the object (a target object) existing in the periphery of the vehicle M (for example, the front, the rear, and the side of the vehicle M), and outputs the measurement result to the automatic driving control device 100.

The vehicle sensor 14 includes, for example, a vehicle speed sensor which detects the speed of the vehicle M, an acceleration sensor which detects the acceleration of the vehicle M, an angular velocity sensor which detects the angular velocity around the vertical axis of the vehicle M, and an orientation sensor which detects the direction of the vehicle M, or the like. Further, the vehicle sensor 14 includes a radio wave intensity sensor which detects the radio wave intensity (that is, a communication intensity) of radio waves used for communication by the communication device 30 which will be described later. The vehicle sensor 14 outputs the detection result of each sensor to the automatic driving control device 100.

The input and output device 20 includes an output device, which outputs various information to a user of the vehicle M, and an input device, which receives various input operations from the user of the vehicle M. In the embodiment, the user is not limited to a person who manages or owns the vehicle M and uses the vehicle M. For example, the user may be a person who uses the vehicle M on behalf of the person who manages or owns the vehicle M at the request of the person who manages or owns the vehicle M. The output device of the input and output device 20 is, for example, a display which performs displaying based upon the processing result of the automatic driving control device 100. The output device may be a speaker, a buzzer, an indicator light, or the like. Further, the input device of the input and output device 20 is, for example, a touch panel or an operation button (a key, a switch, or the like) which outputs an operation signal corresponding to the input operation received from the user to the automatic driving control device 100.

The communication device 30 is connected to a network 35 and communicates with another device provided outside the vehicle system 1 via the network 35. The network 35 is, for example, a mobile communication network, a Wi-Fi network, Bluetooth (registered trademark), Dedicated Short Range Communication (DSRC), or the like.

The communication device 30 communicates with, for example, a terminal device 300 carried by the user of the vehicle M and a parking lot management device 400 which manages a parking lot PA in which the vehicle M can be parked. The terminal device 300 is, for example, a smartphone, a tablet terminal, or the like, and is an electronic device connected to the network 35 and including an input and output device 310. The input and output device 310 is, for example, a display, which displays various information to the user, a touch panel, which receives the input operation of the user, or the like. The parking lot PA and the parking lot management device 400 will be described later.

The navigation device 40 includes a Global Navigation Satellite System (GNSS) receiver 41 and an input and output device 42. Further, the navigation device 40 includes a storage device (not illustrated) such as a flash memory or the like, and first map information 43 is stored in the storage device. The first map information 43 is, for example, information representing a road shape by a link indicating a road and a node connected by the link. Further, the first map information 43 may include information representing the curvature of the road and a Point Of Interest (POI).

The GNSS receiver 41 specifies the latitude and longitude of a point where the vehicle M is positioned as the position of the vehicle M based upon the signal received from a GNSS satellite. Further, the navigation device 40 may specify or correct the position of the vehicle M by an Inertial Navigation System (INS) using the output of the vehicle sensor 14.

The input and output device 42 includes an output device, which outputs various information to the user of the vehicle M, and an input device, which receives various input operations from the user of the vehicle M. The output device of the input and output device 42 is, for example, a display which performs displaying based upon the processing result of the navigation device 40 (for example, displays a route on the map, which will be described later). Further, the input device of the input and output device 42 is, for example, a touch panel or an operation button (a key, a switch, or the like) which outputs the operation signal corresponding to the input operation received from the user to the navigation device 40. The input and output device 42 may be shared with the input and output device 20.

For example, the navigation device 40 determines a route from the position of the vehicle M specified by the GNSS receiver 41 to the destination inputted by the user (hereinafter, also referred to as the route on the map) with reference to the first map information 43. Next, the navigation device 40 guides the determined route on the map to the user by the input and output device 42. Further, the navigation device 40 outputs information indicating the position of the vehicle M specified by the GNSS receiver 41 and information indicating the determined route on the map to the automatic driving control device 100.

The navigation device 40 may be realized by a function of the terminal device 300. Further, for example, the communication device 30 may be configured to transmit the information indicating the position of the vehicle M and the destination inputted by the user to a server device (a navigation server) outside the vehicle system 1, thereby realizing the function of the navigation device 40 by the server device.

The driving operator 50 includes an operator such as an accelerator pedal, a brake pedal, a shift lever, a steering wheel, a variant steering wheel, a joystick, and the like. The driving operator 50 is provided with a sensor, which detects the amount of the operation or the presence or absence of operation on the driving operator 50. The detection result by the sensor of the driving operator 50 is outputted to a part or all of the automatic driving control device 100, the traveling driving force output device 200, the brake device 210, and the steering device 220.

The traveling driving force output device 200 outputs the traveling driving force (torque) for the vehicle M to travel to the drive wheel. The traveling driving force output device 200 includes, for example, an electric motor and an electric motor Electronic Control Unit (ECU) which controls the electric motor. The electric motor ECU controls the electric motor based upon the detection result by the sensor of the driving operator 50 (for example, the accelerator pedal) and control information from the automatic driving control device 100. Further, when the vehicle M includes an internal combustion engine and a transmission as a drive source, the traveling driving force output device 200 may include the internal combustion engine, the transmission, and the ECU which controls the internal combustion engine and the transmission.

The brake device 210 includes, for example, a brake caliper, a cylinder which transmits hydraulic pressure to the brake caliper, an electric motor which generates the hydraulic pressure in the cylinder, and a brake ECU. The brake ECU controls the electric motor of the brake device 210 based upon the detection result by the sensor of the driving operator 50 (for example, the brake pedal) and the control information from the automatic driving control device 100, and outputs the brake torque in accordance with a brake operation to each wheel.

The steering device 220 includes, for example, a steering ECU and an electric motor. The electric motor of the steering device 220 changes the direction of the steering wheel by, for example, applying a force to a rack and pinion mechanism. The steering ECU drives the electric motor of the steering device 220 based upon the detection result by the sensor of the driving operator 50 (for example, the steering wheel) and the control information from the automatic driving control device 100, and changes the direction of the steering wheel.

[Automatic Driving Control Device]

The automatic driving control device 100 includes an environment recognition unit 110, a high-precision position recognition unit 120, an action plan generation unit 130, and an action control unit 140. Further, the automatic driving control device 100 includes a storage device (not illustrated) realized by a flash memory or the like accessible to each functional unit (for example, the high-precision position recognition unit 120) of the automatic driving control device 100, and second map information 150 is stored in the storage device.

The second map information 150 is more accurate map information than the first map information 43. The second map information 150 includes, for example, information indicating the center of a lane, information indicating a lane boundary line (for example, a road lane marking), and the like. The second map information 150 may include road information, traffic regulation information, address information, facility information, telephone number information, and the like.

Further, the second map information 150 may be updated at any time when the communication device 30 communicates with another device. For example, when the vehicle M enters the parking lot PA, the communication device 30 receives information indicating the lanes in the parking lot PA, the position of each parking space, and the like (hereinafter, also referred to as map information in the parking lot) from the parking lot management device 400. Next, the automatic driving control device 100 updates the second map information 150 to incorporate the received map information in the parking lot into the second map information 150. As a result, the automatic driving control device 100 can specify the position of each parking space in the parking lot PA, or the like with reference to the second map information 150. Further, the second map information 150 may be updated when the communication device 30 communicates with a server, which distributes the map information, or the like.

The environment recognition unit 110 performs sensor fusion processing on the information to be acquired by a part or all of the camera 11, the radar device 12, and the finder 13, recognizes an object existing in the periphery of the vehicle M and also recognizes the position of the object. The environment recognition unit 110 recognizes, for example, obstacles, road shapes, traffic lights, guardrails, utility poles, surrounding vehicles (including the traveling status, such as the speed, acceleration, or the like, and parking state), lane marks, pedestrians, or the like, and also recognizes positions thereof.

The high-precision position recognition unit 120 recognizes the detailed position and posture of the vehicle M with reference to the position of the vehicle M specified by the navigation device 40, the detection result by the vehicle sensor 14, the image photographed by the camera 11, the second map information, or the like. The high-precision position recognition unit 120 recognizes, for example, the traveling lane on which the vehicle M is traveling, or recognizes a relative position and a posture of the own vehicle with respect to the traveling lane. The high-precision position recognition unit 120 also recognizes, for example, the position of the vehicle M in the parking lot PA, or the like.

The action plan generation unit 130 generates an action plan of the vehicle M. Specifically, the action plan generation unit 130 generates a target track, on which the vehicle M will travel in the future, as an action plan of the vehicle M. For example, the target track is information represented by arranging points (track points) to be reached by the vehicle M for each predetermined traveling distance (for example, about several [m]). Further, the target track may include information on speed elements such as the target speed, the target acceleration, and the like of the vehicle M at each predetermined time or at each track point. The action plan generation unit 130 generates the action plan, for example, according to an instruction of the parking lot management device 400 received by the communication device 30.

The action control unit 140 controls the vehicle M to act according to the action plan generated by the action plan generation unit 130. Specifically, the action control unit 140 controls the traveling driving force output device 200, the brake device 210, and the steering device 220 so that the vehicle M passes the target track generated by the action plan generation unit 130 at the scheduled time. The action control unit 140 controls, for example, the traveling driving force output device 200 and the brake device 210 based upon the speed element associated with the target track, or controls the steering device 220 according to a curvature degree of the target trajectory.

Each functional unit of the automatic driving control device 100 is realized, for example, when a central processing unit (CPU) executes a predetermined program (software). A part or all of the functional units of the automatic driving control device 100 may be realized by hardware, such as Lame Scale Integration (LSI), an Application Specific Integrated Circuit (ASIC), a Field-Programmable Gate Array (FPGA), and a Graphics Processing Unit (GPU), or the like, and for example, the storage device for storing the second map information 150 and the high-precision position recognition unit 120 may be realized by a Map Positioning Unit (MPU). A part or all of the functional units of the automatic driving control device 100 may be realized by the cooperation of the software and the hardware.

[Parking Lot Managed By Parking Lot Management Device]

Figure 2:
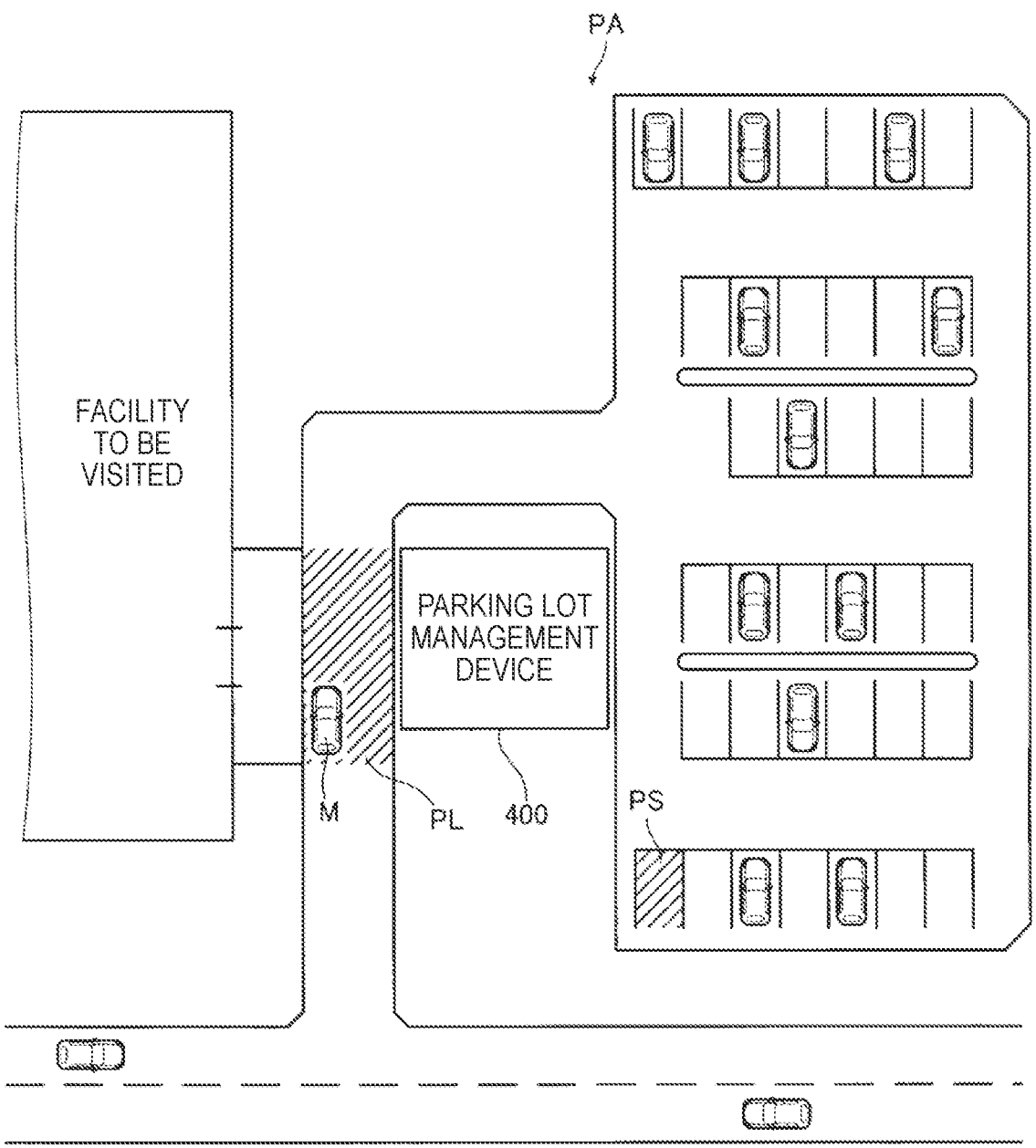
FIG. 2 is a diagram illustrating an example of a parking lot managed by a parking lot management device of the embodiment.

Next, an example of the parking lot PA will be described with reference to FIG. 2. As illustrated in FIG. 2, the parking lot PA is a parking lot managed by the parking lot management device 400 and is an automatic valet parking type parking lot provided as an annex in a visiting facility to be visited by a user. The parking lot PA includes a plurality of parking spaces PS capable of accommodating a vehicle (for example, the vehicle M) and a boarding area PL provided in front of the plurality of parking spaces PS.

Hereinafter, an example in which the user of the vehicle M uses the parking lot PA will be described.

The user of the vehicle M rides the vehicle M on the boarding area PL, and gets off from the vehicle M at the boarding area PL.

After the user gets off the vehicle M, the vehicle M performs automatic driving and starts a self-propelled entry event to move the vehicle M to the parking space PS in the parking lot PA. For example, the user transmits a request for starting the self-propelled entry event to the parking lot management device 400 by using the terminal device 300. In response to the request, the parking lot management device 400 instructs the vehicle M to perform the self-propelled entry event for allowing the vehicle M to be parked in a predetermined parking space PS. According to this instruction, the vehicle M moves to the parking space PS instructed by the parking lot management device 400 while being guided by the parking lot management device 400 and performing sensing by the camera 11, the radar device 12 or the finder 13 or the like. As a result, the vehicle M is parked at the parking space PS instructed by the parking lot management device 400 as a parking position.

Further, when the vehicle M exits, the vehicle M performs the automatic driving and performs a self-propelled exit event to move the vehicle M from the parking space PS to the boarding area PL. For example, the user transmits a request for starting the self-propelled exit event to the parking lot management device 400 by using the terminal device 300. In response to the request, the parking lot management device 400 instructs the vehicle M to perform the self-propelled exit event to move the vehicle M from the parking space PS, where the vehicle M is parked, to the boarding area PL. According to this instruction, the vehicle M moves to the boarding area PL while being guided by the parking lot management device 400 and performing sensing by the camera 11, the radar device 12, the finder 13, or the like. The user of the vehicle M gets on the vehicle M at the boarding area PL and exits from the parking lot PA.

Further, from a viewpoint of effective utilization of the parking lot PA, the parking lot management device 400 can perform parking again, so-called "re-parking" in which the parking position of the vehicle M, which has already been parked, is changed to another parking position in the parking lot PA.

[Parking Lot Management Device]

Figures 3, 4:
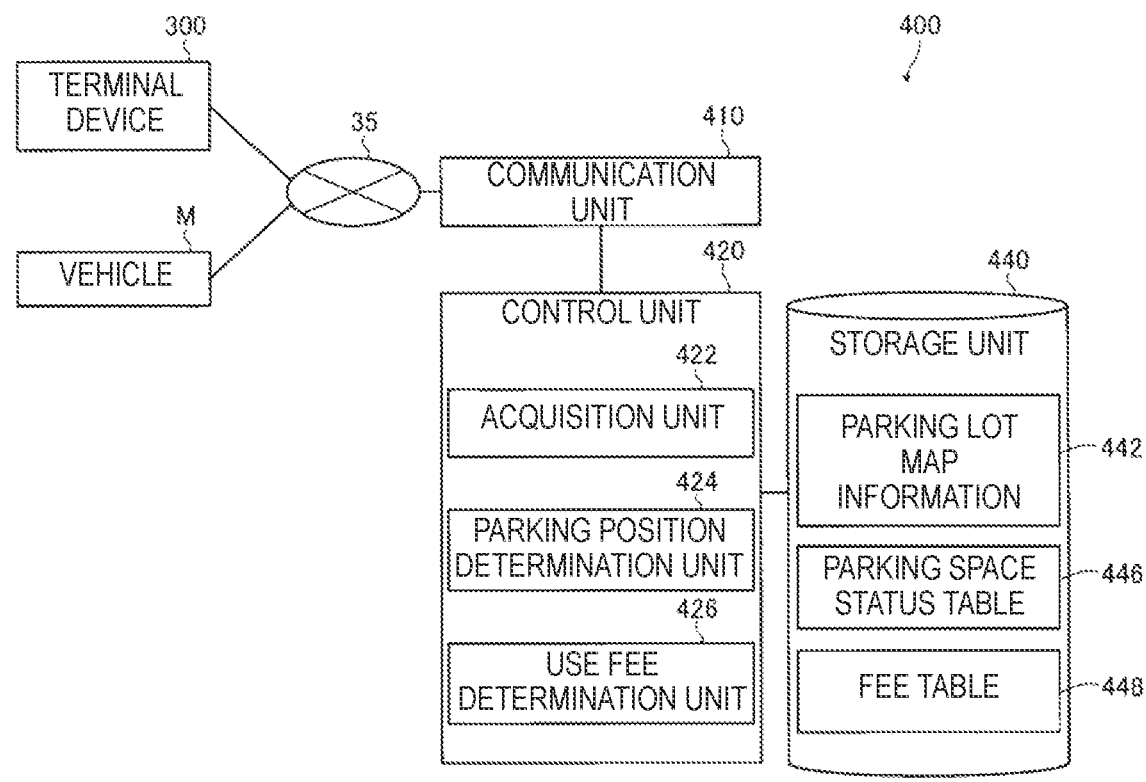
FIG. 3 is a diagram illustrating an example of a configuration of the parking lot management device of the embodiment.
FIG. 4 is a diagram illustrating an example of a parking space status table.

Next, an example of a configuration of the parking lot management device 400 will be described with reference to FIG. 3. As illustrated in FIG. 3, the parking lot management device 400 includes, for example, a communication unit 410, a control unit 420, and a storage unit 440. The control unit 420 includes, for example, an acquisition unit 422, a parking position determination unit 424, and a use fee determination unit 426. Each component of the control unit 420 may be realized, for example, when a hardware processor such as a CPU executes a program (software). A part or all of these components may be realized by hardware, such as LSI, an ASIC, an FPGA, a GPU, and the like (including a circuit unit; circuitry), or may be realized by the cooperation of the software and the hardware. The program may be stored in advance in a storage device, such as an HDD, a flash memory, and the like (a storage device including a non-transient storage medium), may be stored in a removable storage medium (the non-transient storage medium) such as a DVD, a CD-ROM, or the like and may be installed by attaching the storage medium to a drive device, and may be a program managed by another server and executed.

Information such as parking lot map information 442, a parking space state table 446, a fee table 448, or the like is stored in the storage unit 440. The storage unit 440 is realized by an HDD, a flash memory, or the like.

For example, when the vehicle M enters the parking lot PA, the communication unit 410 wirelessly (for example, the network 35) communicates with the vehicle M or the terminal device 300 of the user. The control unit 420 guides the vehicle M to the parking space PS based upon the information acquired via the communication unit 410 and the information stored in the storage unit 440. The parking lot map information 442 is information which geometrically represents a structure of the parking lot PA. Further, the parking lot map information 442 includes coordinates for each parking space PS.

The acquisition unit 422 acquires information including a desired environment regarding the parking position of the vehicle M (hereinafter, may be referred to as desired environment information) via the communication unit 410. The information including the desired environment regarding the parking position of the vehicle M is information to be used when the parking position is selected. The acquisition unit 422 is not necessarily limited to acquiring the desired environment information from the vehicle M and the terminal device 300 of the user but may acquire the desired environment information from a device installed in the parking lot PA (for example, an entrance gate of the parking lot PA and the boarding area PL).

The desired environment may include, for example, an allowable space with other adjacent vehicles which can be allowed in the parking lot PA. The allowable space with other adjacent vehicles which can be allowed in the parking lot PA is information on the distance between the vehicle M and a vehicle parked in the adjacent parking space PS when the vehicle M is parked in the parking space PS, and, for example, may be information including an allowable limit distance, or may be separately represented such as large, medium, and small (wide, medium, and narrow). The user can designate the allowable space with other adjacent vehicles, thereby improving the convenience of the parking lot PA.

The desired environment may include, for example, an installation environment of the parking space PS. The installation environment includes at least one of the presence or absence of a roof of the parking space PS and the presence or absence of an area frame of the parking space PS. When the parking lot SP is outdoors, the user can designate a parking space PS with a roof on a hot summer day, a rainy day, a snowy day, or the like. On the other hand, when the vehicle is provided with a photovoltaic power generation panel, the user can select a parking space PS without the roof.

Further, a user, who feels safe when the vehicle M is parked in the parking space PS to which the area frame is fixed, can designate a parking space PS with the area frame, and a user who is not interested in the area frame can designate a parking space PS without the area frame. The user can designate the installation environment, such as the presence or absence of the roof of the parking space PS, the presence or absence of the area frame of the parking space PS, or the like, thereby improving the convenience of the parking lot SP.

The desired environment may include, for example, the distance from the boarding area PL. The user can designate the distance from the boarding area PL in an automatic valet parking type parking lot PA. For a user who is concerned about the fuel consumption, power consumption, tire wear, or the like, the convenience of the parking lot PA is improved. Further, when a user wishes to shorten the time for the vehicle M to arrive at the boarding area PL after transmitting a request for starting the self-propelled exit event to the parking lot management device 400 at the time of exiting from the parking lot PA, the user may set in advance the distance from the boarding area PL to be short. If the user can designate the distance from the boarding area PL in the automatic valet parking type parking lot PA, the convenience of the parking lot PA is further improved.

The desired environment may include, for example, permission or non-permission of the re-parking. When performing the re-parking, the parking lot management device 400 is subject to obtaining permission from the user of the target vehicle M. As a result, since the re-parking is performed after the permission from the user is obtained in advance, the parking lot PA can be utilized more effectively without causing distrust, discomfort, or the like of the user.

Further, the acquisition unit 422 acquires parking space information of the vehicle M already being parked in the parking lot PA. The parking space information is stored, for example, in the form of the parking space state table 446. As illustrated in FIG. 4, the parking space state table 446 includes, for example, information indicating whether a parking space ID, which is identification information of the parking space PS, is in a vacant status or a full (parked) status, a vehicle ID which is the identification information of the parked vehicle M when the parking space ID is in the full status, and entry time of the vehicle M when the parking space ID is in the full status. The entry time is recorded in association with the vehicle ID of the vehicle M when the vehicle M enters the parking lot PA.

The parking position determination unit 424 determines a parking position of the vehicle M based upon the desired environment information and the parking space information acquired by the acquisition unit 422. That is, the parking position determination unit 424 selects a parking space PS matching the desired environment information among the parking spaces PS in the vacant status obtained from the parking space information. At this time, the parking position determination unit 424 considers the desired environment information such as the presence or absence of the roof of the parking space PS, the presence or absence of the area frame of the parking space PS, the distance from the boarding area PL, or the like.

The use fee determination unit 426 determines the use fee of the parking lot PA based upon the above-described desired environment information and/or the determined parking position. The use fee determination unit 426 may determine the use fee of the parking lot PA based upon the desired environment information, may determine the use fee of the parking lot PA according to the parking position determined based upon the desired environment information, and may determine the use fee of the parking lot PA based upon both the determined parking position and the desired environment information.

The use fee determination unit 426 can set the use fee to be higher as the allowable space with other adjacent vehicles which can be allowed in the parking lot PA is larger. In the parking lot PA of limited space, as the allowable space with other adjacent vehicles M is larger, the parking space PS which can accommodate the vehicle M is limited and the number of vehicles to be accommodated therein decreases, and thus, the parking lot management device 400 can collect an appropriate use fee by setting the use fee to be higher as the allowable space is larger.

Further, the use fee determination unit 426 can determine the use fee based upon the installation environment of the parking space PS. For example, the use fee of the parking space PS with the roof may be set to be higher than the use fee of the parking space PS without the roof, and the use fee of the parking space PS with the area frame may be set to be higher than that of the parking space PS without the area frame. In general, a parking space PS with a roof requires a greater initial investment than that of a parking space PS without a roof. Further, the parking space PS without the area frame can secure a larger parking space PS than that of the parking space PS with the area frame.

Particularly, in the automatic valet parking type parking lot PS, in the case of the parking space PS without the area frame, since the parking space PS can be changed depending on the use situation, it is possible to utilize the parking lot PA more effectively. In this manner, both the user and the parking lot management device 400 can enjoy merit by reducing the use fee to the user who cooperates in the effective utilization of the parking lot PA.

Figure 5:
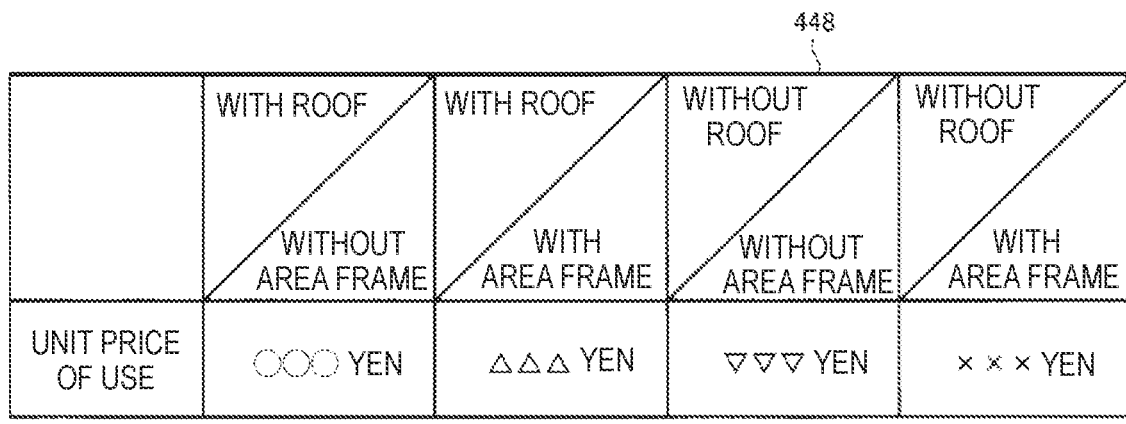
FIG. 5 is a diagram illustrating an example of a fee table.
Figure 6:
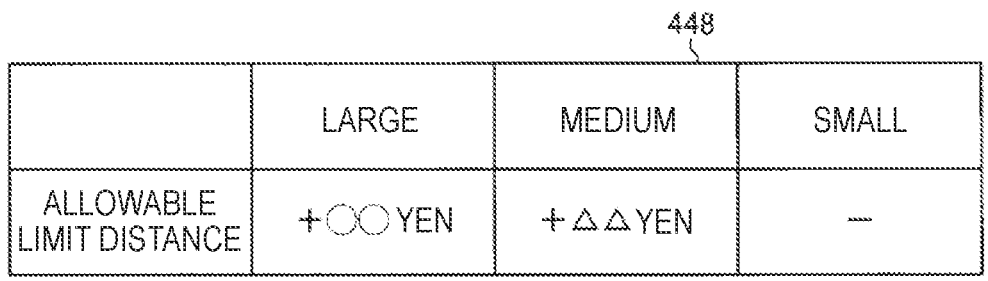
FIG. 6 is a diagram illustrating another example of the fee table.

As illustrated in FIGS. 5 and 6, the use fee determined by the use fee determination unit 426 may be stored in the form of the fee table 448 in association with the desired environment information. FIG. 5 illustrates the fee table 448 in which the presence or absence of the roof, the presence or absence of the area frame, and a unit price of use are associated with each other, and FIG. 6 illustrates the fee table 448 in which the allowable limit distance and an additional fee are associated with each other. The example of FIG. 5 illustrates the fee table 448 in which the desired environment information and the unit price of use are associated with each other, and may illustrate the fee table 448 in which the parking position and the unit price of use are associated with each other.

For example, the use fee determination unit 426 determines the use fee by multiplying the unit price of use based upon the presence or absence of the roof and the presence or absence of the area frame by use time, and by further adding an additional fee in accordance with the allowable limit distance. Further, the use fee determination unit 426 may determine the use fee by adding a point to each item and by multiplying a total point by a predetermined point unit price.

As described above, in the parking lot management device 400, when the vehicle M enters the parking lot PA, the acquisition unit 422 acquires the desired environment information which is the information including the desired environment regarding the parking space PS of the vehicle M, and thus, the parking position determination unit 424 determines an accommodation position suitable for the desired environment of the user, and the use fee determination unit determines the use fee in accordance with the desired environment. Therefore, the parking lot management device 400 can determine the parking position according to the desired environment and can also collect the appropriate use fee, thereby making it possible to smoothly manage the parking lot PA. Further, since the user can accommodate the vehicle M in the parking space PS according to the desired environment, the convenience of the parking lot PA is improved.

Further, the use fee determination unit 426 can reduce the use fee with respect to the user who permits the re-parking. The parking lot management device 400 can utilize the parking lot PA more effectively by performing the re-parking. Both the user and the parking lot management device 400 can enjoy the merit by reducing the use fee to the user who cooperates in the effective utilization of the parking lot PA. Further, instead of reducing the use fee, the use fee determination unit 426 may give a reward such as a discount coupon for the next use fee, a coupon which can be used at the visiting facility, electronic money, or the like.

Further, the use fee determination unit 426 may change the use fee depending on the use time (parking time), a parking time zone (early morning, midnight, daytime, or the like), a congestion situation of the parking lot PA (when the parking lot PA is congested, and when parking lot PA is not congested), or the like in addition to the vehicle information and the maintenance request described above. The use fee determination unit 426 changes the use fee based upon the use situation of the parking lot PA, thereby making it possible to collect the use fee in accordance with the load of the parking lot management device 400. Further, the use fee changes based upon the use situation of the parking lot PA, thereby making it possible to attract a user and improve the operation rate of the parking lot PA.

The embodiment describes that a so-called vehicle is parked in a parking lot. However, an idea of the present disclosure is not limited to such an embodiment and is also applied to a moving body including a vehicle (for example, a robot). That is, the present disclosure also includes a case where the moving body is accommodated in an accommodation area where the moving body can be accommodated. In consideration of this idea, "parking" is extended to a concept of "stop", and the "parking lot management device" of the embodiment is extended to a concept of the "accommodation area management device". "Exit" and "entry" are extended to concepts of "leaving" and "approaching". The "re-parking" is extended to a concept of "an accommodation position change".

While a mode for implementing the present disclosure is described above by using the embodiment, the present disclosure is not limited to the embodiment, and various modifications and substitutions can be added within the scope not departing from the gist of the present disclosure.

Further, at least the following items are described in this specification. Components or the like corresponding to the above-described embodiments are shown in parentheses, but the present disclosure is not limited thereto.

(1) An accommodation area management device (parking lot management device 400), which manages an accommodation area (parking lot PA) for accommodating a moving body (vehicle M), the accommodation area management device including:

an acquisition unit (acquisition unit 422) configured to acquire information including a desired environment regarding an accommodation position of the moving body when the moving body enters the accommodation area;

an accommodation position determination unit (parking position determination unit 424) configured to determine the accommodation position of the moving body based upon the information; and a use fee determination unit (use fee determination unit 426) configured to determine a use fee of the accommodation area based upon at least one of the information and the accommodation position.

According to (1), since the user can accommodate the moving body at the accommodation position according to the desired environment, the convenience of the accommodation area is improved. Further, in the accommodation area management device, when the moving body enters the accommodation area, the acquisition unit acquires the information including the desired environment regarding the accommodation position of the moving body. As a result, the accommodation position determination unit determines the accommodation position suitable for the desired environment, and the use fee determination unit determines the use fee in accordance with the desired environment. Therefore, the accommodation area management device can appropriately manage the accommodation area according to the desired environment.

(2) The accommodation area management device according to (1), in which:

the desired environment includes an allowable space with other adjacent moving bodies which can be allowed in the accommodation area; and the use fee determination unit increases the use fee as the allowable space is larger.

According to (2), the user can designate the allowable space with other adjacent moving bodies, thereby improving the convenience of the accommodation area. Further, as the allowable space with other adjacent moving bodies in the accommodation area of limited space is larger, the number of vehicles to be accommodated in the accommodation area becomes smaller. Therefore, the accommodation area management device can collect an appropriate use fee by setting the use fee to be higher as the allowable space becomes larger.

(3) The accommodation area management device according to (1) or (2), in which:

the desired environment includes an installation environment of an accommodation space; and the use fee determination unit configured to determine the use fee based upon the installation environment.

According to (3), the user can designate the installation environment of the accommodation space, thereby improving the convenience of the accommodation area. Further, since the use fee determination unit determines the use fee based upon the installation environment of the accommodation space, the accommodation area management device can collect the appropriate use fee depending on the installation environment of the accommodation space.

(4) The accommodation area management device according to (3), in which the installation environment includes at least one of a presence or absence of a roof of the accommodation space and a presence or absence of an area frame of the accommodation space.

According to (4), the user can designate the installation environment such as the presence or absence of the roof of the accommodation space, the presence or absence of the area frame of the accommodation space, or the like, thereby improving the convenience of the accommodation area. Further, the accommodation area management device can collect the appropriate use fee according to at least one of the presence or absence of the roof of the accommodation space and the presence or absence of the area frame of the accommodation space.

(5) The accommodation area management device according to (3) or (4), in which:

the accommodation area includes a boarding area (boarding area PL) for allowing a user of the moving body to get on and off;

the accommodation area management device is configured to execute automatic valet parking control configured to automatically drive the moving body at least between the boarding area and the accommodation space for accommodating the moving body; and the installation environment includes a distance from the boarding area to the accommodation space.

According to (5), the user can designate the distance from the boarding area to the accommodation space in an automatic valet parking type accommodation area, thereby improving the convenience of the accommodation area. Further, since the accommodation area management device is required to control the exit and the entry of the moving body in the automatic valet parking type accommodation area, the accommodation area management device can collect the appropriate use fee according to the load thereof.

(6) The accommodation area management device according to (1) or (2), in which the desired environment includes permission of an accommodation position change (re-parking) configured to change the accommodation position of the moving body, which is stopped in the accommodation area to another accommodation position in the accommodation area.

According to (6), the accommodation area management device can utilize the accommodation area more effectively by performing the accommodation position change. Further, since the accommodation position change is performed after the permission of the user has been obtained in advance, it is possible to avoid what causes distrust, discomfort, or the like of the user.

(7) The accommodation area management device according to any one of (1) to (6), further including:

a communication unit (communication unit 410) configured to communicate with the moving body or a terminal device (terminal device 300) of a user of the moving body, in which the acquisition unit acquires the information via the communication unit.

According to (7), since the acquisition unit acquires the information via the communication unit, the information can be easily acquired.

(8) The accommodation area management device according to any one of (1) to (7), in which the use fee determination unit is configured to change the use fee based upon an use situation of the accommodation area.

According to (8), the use fee is changed based upon the use situation of the accommodation area, thereby making it possible to collect the use fee in accordance with the load of the accommodation area management device. Further, the use fee is changed based upon the use situation of the accommodation area, thereby making it possible to attract a user and improve the operation rate of the accommodation area.

What is claimed is:

1. An accommodation area management device, which manages an accommodation area including a plurality of accommodation spaces capable of accommodating a moving body that includes a plurality of sensors configured to obtain information related to a current state of the moving body, the accommodation area management device comprising:

an acquisition unit configured to acquire information including a desired environment regarding an accommodation position of the moving body when the moving body enters the accommodation area;

an accommodation position determination unit configured to determine the accommodation position of the moving body based upon the information;

a use fee determination unit configured to determine a use fee of the accommodation area based upon at least one of the information and the accommodation position, wherein the acquired information regarding the desired environment includes information regarding an installation environment of an accommodation space, within the plurality of accommodation spaces, that corresponds to the determined accommodation position, the use fee determination unit is configured to determine the use fee based upon one or more characteristics of the installation environment indicated by the information regarding the installation environment, the accommodation area further includes a boarding area for allowing a user of the moving body to get on and off, the accommodation area management device is configured to execute automatic valet parking control configured to automatically drive, in conjunction with the obtained information related to the current state of the moving body and based on an action plan generated by the moving body in accordance with an instruction from the accommodation area management device, the moving body at least between the boarding area and the accommodation space that corresponds to the determined accommodation position, for accommodating the moving body, the information regarding the installation environment further indicates a distance from the boarding area to the accommodation space that corresponds to the determined accommodation position, and the acquisition unit, the accommodation position determination unit, and the use fee determination unit are each implemented via at least one processor.

2. The accommodation area management device according to claim 1, wherein:

the acquired information regarding the desired environment further includes information regarding an allowable space with other adjacent moving bodies which can be allowed in the accommodation area; and the use fee determination unit increases the use fee as the allowable space increases.

3. The accommodation area management device according to claim 1, wherein the installation environment includes at least one of a presence or absence of a roof of the accommodation space and a presence or absence of an area frame of the accommodation space.

4. The accommodation area management device according to claim 1, wherein the acquired information regarding the desired environment further includes permission of an accommodation position change configured to change the accommodation position of the moving body, which is stopped in the accommodation area, to another accommodation position in the accommodation area.

5. The accommodation area management device according to claim 1, further comprising:

a communication unit configured to communicate with the moving body or a terminal device of a user of the moving body, wherein the acquisition unit is configured to acquire the information via the communication unit, and the communication unit is implemented via at least one processor.

6. The accommodation area management device according to claim 1, wherein the use fee determination unit is configured to change the use fee based upon a use situation of the accommodation area.

* * * * *